US00RE49130E

(19) United States
(12) Reissued Patent
Swygert et al.

(10) Patent Number: US RE49,130 E
(45) Date of Reissued Patent: Jul. 12, 2022

(54) LADDER ATTACHMENT PLATFORM

(71) Applicants: Richard W. Swygert, Springfield, SC (US); William Nelson Lewis, Jr., Windsor, SC (US)

(72) Inventors: Richard W. Swygert, Springfield, SC (US); William Nelson Lewis, Jr., Windsor, SC (US)

(73) Assignees: Savannah River Nuclear Solutions, LLC, Aiken, SC (US); Richard W. Swygert, Springfield, SC (US); William Nelson Lewis, Jr., Windsor, SC (US)

(21) Appl. No.: 17/115,930

(22) Filed: Dec. 9, 2020

Related U.S. Patent Documents

Reissue of:
(64) Patent No.: 8,250,992
Issued: Aug. 28, 2012
Appl. No.: 12/799,648
Filed: Apr. 29, 2010

(51) Int. Cl.

| | |
|---|---|
| ***E06C 5/00*** | (2006.01) |
| ***B61D 23/00*** | (2006.01) |
| ***E06C 5/44*** | (2006.01) |
| ***E06C 7/16*** | (2006.01) |

(52) U.S. Cl.
CPC ..... *B61D 23/00* (2013.01); *E06C 5/44* (2013.01); *E06C 7/16* (2013.01)

(58) Field of Classification Search
CPC ..... B61D 23/00; E06C 5/44; E06C 7/16
See application file for complete search history.

(56) References Cited

U.S. PATENT DOCUMENTS

| | | | | | |
|---|---|---|---|---|---|
| 301,326 | A | * | 7/1884 | Baker et al. | 182/91 |
| 483,233 | A | * | 9/1892 | Matthews | 105/460 |
| 1,413,913 | A | | 4/1922 | Hedley | |
| 1,713,730 | A | * | 5/1929 | Wright | 105/425 |
| RE18,323 | E | | 1/1932 | Woodruff | |
| 2,035,537 | A | | 3/1936 | Cowan | |
| 2,151,135 | A | | 3/1939 | Moberg | |
| 2,341,890 | A | | 2/1944 | Wiggins | |
| 2,528,074 | A | | 10/1950 | Patton | |
| 3,084,638 | A | | 4/1963 | Allegrette | |
| 3,231,043 | A | | 1/1966 | Brown | |
| 3,511,338 | A | | 5/1970 | Chapman | |
| 3,598,061 | A | | 8/1971 | Flowers | |
| 3,601,220 | A | * | 8/1971 | Saucier | B60R 3/02 182/84 |

(Continued)

OTHER PUBLICATIONS

Website Advertisment for Ballast Car Stand, p. 1 of 1, PortaCo. Inc.

*Primary Examiner* — Jeffrey R Jastrzab
(74) *Attorney, Agent, or Firm* — Dority & Manning, P.A.

(57) ABSTRACT

A ladder attachment platform is provided that includes a base for attachment to a ladder that has first and second side rails and a plurality of rungs that extend between in a lateral direction. Also included is a user platform for having a user stand thereon that is carried by the base. The user platform may be positioned with respect to the ladder so that it is not located between a first plane that extends through the first side rail and is perpendicular to the lateral direction and a second plane that extends through the second side rail and is perpendicular to the lateral direction.

20 Claims, 5 Drawing Sheets

(56) References Cited

U.S. PATENT DOCUMENTS

| | | | | |
|---|---|---|---|---|
| 4,303,145 | A | 12/1981 | Vazquez | E06C 7/183 182/106 |
| 4,463,826 | A * | 8/1984 | Pearce | 182/20 |
| 4,533,018 | A * | 8/1985 | Tyson | 182/121 |
| 4,644,871 | A | 2/1987 | Arrey | |
| 5,052,515 | A | 10/1991 | Nowlan | |
| D322,485 | S | 12/1991 | Leeland | |
| D522,666 | S | 6/2006 | Clayton, Jr. | |
| 2005/0139116 | A1 | 6/2005 | Brown | |
| 2006/0185554 | A1 | 8/2006 | Dalrymple | |
| 2008/0060545 | A1 * | 3/2008 | Barbara | 105/443 |

* cited by examiner

LADDER ATTACHMENT PLATFORM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

STATEMENT AS TO RIGHTS TO INVENTIONS MADE UNDER FEDERALLY SPONSORED RESEARCH AND DEVELOPMENT

This invention was made with Government support under Contract No. DE-AC09-96SR18500 awarded by the United States Department of Energy. The Government has certain rights in the invention.

FIELD OF THE INVENTION

The present invention relates generally to ladder attachment platforms. More particularly, the present application involves a ladder attachment platform that allows a user to stand at a location spaced from the front of the ladder.

BACKGROUND

Ladders are used to gain access to higher vertical locations. In some instances, a user will stand on the ladder to perform an activity or access a particular area. It is known to provide ladders with flat surfaces onto which a user may stand during use of the ladder so that the user is afforded with a wider and more comfortable standing surface. However, it is sometimes the case that a user may want to access an area that is offset from the ladder. Such flat, standing surfaces are not offset from the ladder for stability purposes to ensure that the ladder will not fall over. These surfaces only allow the user to face forward towards the ladder and are thus limited in application. Further, such flat, standing surfaces do not include handrails or other safety features.

Rail cars typically have one or more ladders located thereon. Aside from pulling rail cars, locomotives may push rail cars in certain instances. The pushing of rail cars requires a switchman to ride on the lead rail car to flag and provide watch for the locomotive engineer. Standard practice is for the switchman to ride on a ladder that is typically attached to the side of the lead rail car. The switchman must keep one hand on the ladder in order to firmly hold onto the ladder thus impeding his or her ability to operate an emergency brake, radio, or provide hand signals. Although minimally adequate for short trips, standing on the ladder of a lead rail car during long distance moves is not practical or safe. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
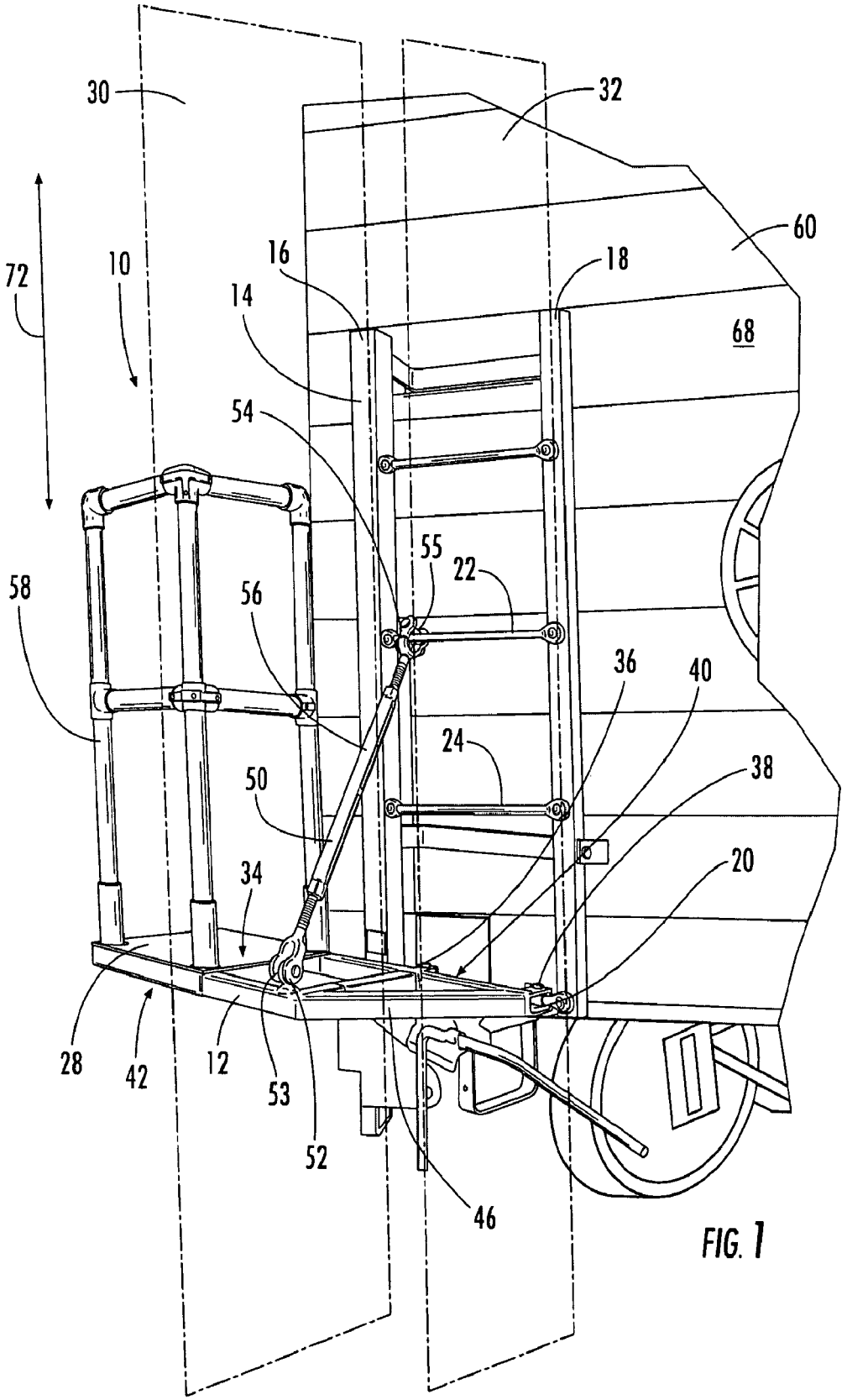
FIG. 1 is a perspective view of a ladder attachment platform in accordance with one exemplary embodiment.
Figure 2:
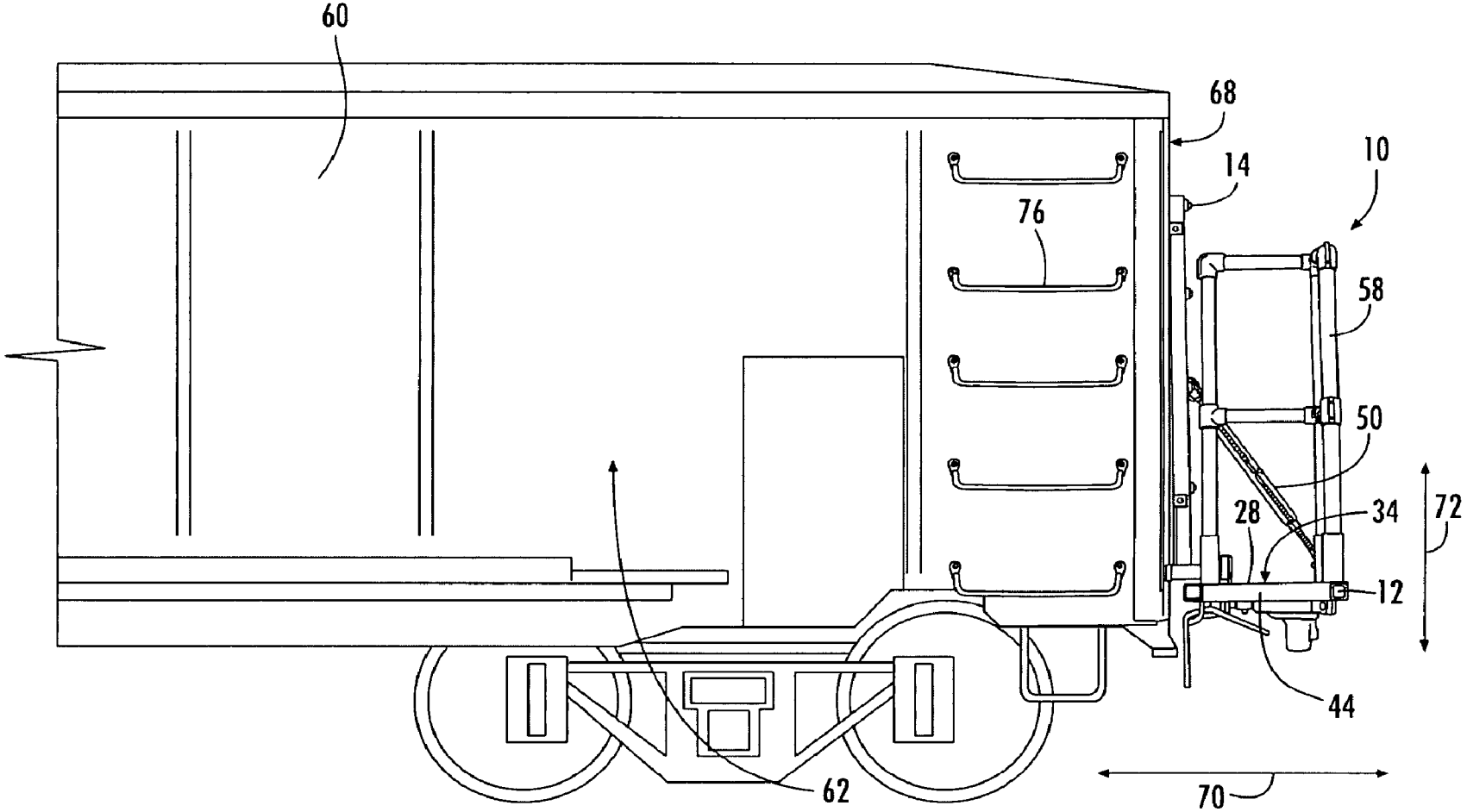
FIG. 2 is a right side elevation view of the ladder attachment platform of FIG. 1.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a ladder attachment platform 10 that can be used in conjunction with a ladder 14 that provides a user platform 28 that allows a user to stand thereon and face multiple directions. The user platform 28 is spaced laterally away from the ladder 14 to afford the user with access to areas away from the ladder 14. A handrail assembly 58 may be included to assist the user in maintaining balance on the user platform 28 during use. The handrail assembly 58 can be incorporated into a rail car 60 so that the user, who may be a switchman, can ride thereon and have one or more hands free in order to operate an emergency brake, radio, or provide flag signals. In other arrangements, the ladder attachment platform 10 can be associated with ladders 14 that are not incorporated onto rail cars 60 so that the user can access additional areas away from the ladder 14.

One exemplary embodiment of the ladder attachment platform 10 is illustrated in FIGS. 1-5. The ladder attachment platform 10 includes a base 12 that may be arranged in a variety of manners. For example, a series of square tubular members can be attached to one another to form a generally open framework structure. Although described as being square tubular members, the components making up the base 12 can be variously arranged and may be for instance rectangular tubular members, circular tubular members, or solid members. In other arrangements, the base 12 can be a closed structure formed from a single piece so that it does not have an open framework structure. The base may be made of any material such as plastic, metal or wood in accordance with various exemplary embodiments. The base 12 may be arranged with respect to a ladder 14 so that a first side 40 of the base 12 faces the ladder 14, and so that a second, opposite side 42 faces away from the ladder 14.

The rail car 60 may include an end 68 that has a ladder 14 located thereon. The ladder attachment platform 10 can be attached to the ladder 14 in accordance with certain exemplary embodiments. The ladder 14 has a first side rail 16 and a second side rail 18 that may extend in a vertical direction 72 and can be spaced from one another in a lateral direction 26. A plurality of rungs 20, 22, and 24 may extend from the first side rail 16 to the second side rail 18 and can run in the lateral direction 26. Any number of rungs can be present in the ladder 14 in accordance with different embodiments. The first and second side rails 16 and 18 may be positioned so that a first plane 30 extending through the first side rail 16 is parallel to a second plane 32 extending through the second side rail 18. The first plane 30 and second plane 32 may each be perpendicular to the lateral direction 26. As such, the first plane 30 and second plane 32 may each be perpendicular to the direction the rungs 20, 22 and 24 extend from the first side rail 16 to the second side rail 18.

The base 12 may be attached to the ladder 14 in a number of manners. As shown, a first attachment member 36 and a second attachment member 38 may be attached to the base 12 and can be likewise attached to the ladder 14. The attachment members 36 and 38 may be clevises and can be welded or otherwise permanently attached to the first side 40 of the base 12. The first rung 20 may be positioned within the openings of the devises and pins can be inserted through the first and second attachment members 36 and 38 in order to effect attachment of the members 36 and 38 to the first rung 20. As such, the attachment members 36 and 38 can be removably attachable to the first rung 20. In other arrangements, a single attachment member 36 can be used and the second attachment member 38 need not be present. Also, although described as being clevises, it is to be understood that the attachment members 36 and 38 need not be clevises in other exemplary embodiments but may be variously arranged. For example, brackets or clamps can be used to attach the turnbuckle to the base 12 and ladder 14 instead of clevises 52 and 54 in accordance with other exemplary embodiments. The attachment members 36 and 38 can be attached to the first rung 20 so that they are capable of rotating thereon. As such, the attachment members 36 and 38 may be pivotally attached to the rung 20. Alternatively, the sizing and pins extending through the attachment members 36 and 38 may be arranged so that the members 36 and 38 are not capable of rotating with respect to the rung 20 but are instead rigidly affixed thereto. The attachment members 36 and 38 may have a length or size that is not adjustable so that the attachment members 36 and 38 cannot be adjusted to vary the distance between the base 12 and the first rung 20 in some embodiments. In other embodiments, the attachment members 36 and 38 may be capable of being adjusted to vary this distance.

A turnbuckle 50 may also be incorporated into the ladder attachment platform 10 in order to help secure the base 12 in place and prevent rotation thereof. The turnbuckle 50 can be attached to both the base 12 and a second rung 22 of the ladder 14 that is higher than the first rung 20 in the vertical direction 72. Although shown as having a single third rung 24 between the rungs 20 and 22 to which the turnbuckle 50 and first and second attachment members 36 and 38 are attached, any number of rungs may be located between these members in other embodiments. For example, from 2-5 rungs, from 3-8 rungs, from 4-10 rungs, or up to 15 rungs may be located between the rung attached to the turnbuckle 50 and the rung attached to the first and second attachment members 36 and 38. Additionally, the rung attached to the turnbuckle 50 may be immediately adjacent the rung to which the first and second attachment members 36 and 38 are attached in other exemplary embodiments.

An eye may extend from the upper surface of the base 12 for use for attachment to the turnbuckle 50. The turnbuckle 50 may include a clevis 52. The clevis 52 can include a threaded stem that is received within a clevis-receiving member 56 of the turnbuckle 50. The clevis 52 defines an opening 53 into which the eye of the base 12 can be positioned. A pin may be inserted through the clevis 52 and eye in order to retain the clevis 52 to the base 12. The clevis 52 may thus be attached to the base 12 in a pivotal engagement. The other end of the turnbuckle 50 can include a clevis 54 that is arranged in a manner similar to the clevis 52. The threaded stem of clevis 54 may be received within internal threading of the clevis-receiving member 56. Additionally, an opening 55 defined by the clevis 54 can be positioned so that the second rung 22 of the ladder 14 is disposed through the opening 55. A pin can be inserted through the clevis 54 and can contact the second rung 22. With such an arrangement, the turnbuckle 50 is suspended on the second rung 22. The attachment of the clevis 54 to the rung 22 may thus be a sliding attachment. However, sliding of the clevis 54 along the lateral direction 26 of the rung 22 may be prevented due to the fixing of the opposite clevis 52 to the base 12. As shown, the openings 53 and 55 of the clevises 52 and 54 are not oriented in the same direction as one another but are instead rotated and oriented 90° to one another. However, in other arrangements the openings 53 and 55 may be oriented in the same direction as one another. Further, although shown as using clevises 52 and 54, the turnbuckle 50 can be attached to the base 12 and rung 22 in other manners. The turnbuckle 50 can be attached to the base 12 at a location remote from the first side 40 so that the turnbuckle 50 attachment functions to prevent the base 12 from rotating about the first rung 20. In some arrangements, the turnbuckle 50 can be attached to the second side 42 of the base 12. As illustrated, the turnbuckle 50 is attached to an eye extending from the upper surface of the base 12 at a location that is proximate to the second side 42.

The clevis-receiving member 56 can be rotated by the user in order to shorten or elongate the turnbuckle 50. The clevises 52 and 54 are both attached by way of a threaded engagement to the clevis-receiving member 56. As such, rotation of the clevis-receiving member 56 causes the threaded clevises 52 and 54 to move outward or inward with respect to the clevis-receiving member 56. The turnbuckle 50 can thus be sized to a length in which the upper surface of the base 12 is horizontal with respect to the ground. Further, adjustability of the turnbuckle 50 allows the ladder attachment platform 10 to be used with ladders 14 having rungs variously spaced from one another. In some embodiments, the length of the turnbuckle 50 can be shortened or elongated when the turnbuckle 50 is attached to both the base 12 and the ladder 14. In other embodiments, the turnbuckle 50 cannot be lengthened or shortened when attached to the base 12 and ladder 14. Further, although shown and described as incorporating a turnbuckle 50, the ladder attachment platform 10 need not include a turnbuckle 50 in accordance with other exemplary embodiments.

The base 12 may include one or more posts extending from the upper surface onto which a handrail assembly 58 is positioned. Although three posts are shown, any number may be used in other embodiments. Still further, no posts need be necessary in yet other exemplary embodiments. In this regard, the handrail assembly 58 may be integrally formed with the base 12. The handrail assembly 58 can be made from tubular or solid members and may be a single component or may be multiple components that are attached to one another. The handrail assembly 58 extends upwards from the base 12 in the vertical direction 72.

The ladder attachment platform 10 also includes a user platform 28 that is carried by the base 12. The user platform 28 can be a solid plate or may be a grate in certain exemplary embodiments. Further, the user platform 28 may be a series of parallel beams or slats in yet other arrangements. The user platform 28 can be configured in any manner that allows a user to stand thereon. The user platform 28 may be square or rectangular in shape in certain arrangements. In yet other exemplary embodiments the user platform 28 can be variously shaped. The upper surface 34 of the user platform 28 may be provided with an anti-skid material or configuration to minimize the chance of slippage of the user when standing on the upper surface 34. The user platform 28 may be located on the upper surface of the base 12. In other exemplary embodiments, the user platform 28 can be located on the lower surface of the base 12 or can extend from a side of the base 12. The user platform 28 may be integrally formed with the base 12 so that these two components are a single piece. In yet other arrangements, the user platform 28 may be removable from the base 12. The user platform 28 may be permanently attached to the base 12. In some exemplary embodiments, the user platform 28 is welded to the base 12 or bolted to the base 12.

The handrail assembly 58 may be arranged adjacent the user platform 28 so as to define a portion of the perimeter of the user platform 28. In this regard, the handrail assembly 58 may impede a user standing on the user platform 28 from exiting the user platform 28 in the direction towards the turnbuckle 50 or the first plane 30 or second plane 32. The handrail assembly 58 can also be positioned with respect to the user platform 28 so as to impede a user on the user platform 28 from exiting the user platform 28 over the second side 42 of the base 12. The handrail assembly 58 may be open so that the user is not impeded by the handrail assembly 58 when exiting other portions of the user platform 28. For example, a portion of the user platform 28 can be located proximate to the first side 40 of the base 12. The handrail assembly 58 may be open at this location so that the user can freely exit the user platform 28 across the first side 40 without being impeded by the handrail assembly 58. Likewise, an end 44 of the base 12 may extend from the first side 44 to the second side 46. The end 44 is located remote from the rail car 60 so that the end 44 is the farthest portion of the base 12 from the rail car 60 in the width direction 66. An end 46 of the base 12 is located opposite from the end 44. The handrail assembly 58 can be arranged so that a user on the user platform 28 can exit the user platform 28 over the end 44 without being impeded by the handrail assembly 58. As such, in accordance with one exemplary embodiment, the perimeter of the user platform 28 may be defined by the handrail assembly 58, the end 44 of the base 12, and the first side 40 of the base 12. The handrail assembly 58 may extend from 2 to 4 feet, from 3 to 5 feet, or up to 10 feet above the upper surface of the base 12 in the vertical direction 72. The handrail assembly 58 may be removable from the base 12 for ease of attachment thereto. In other arrangements, the handrail assembly 58 is permanently attached to the base 12. The handrail assembly 58 may be made out of aluminum in accordance with one exemplary embodiment.

Figure 3:
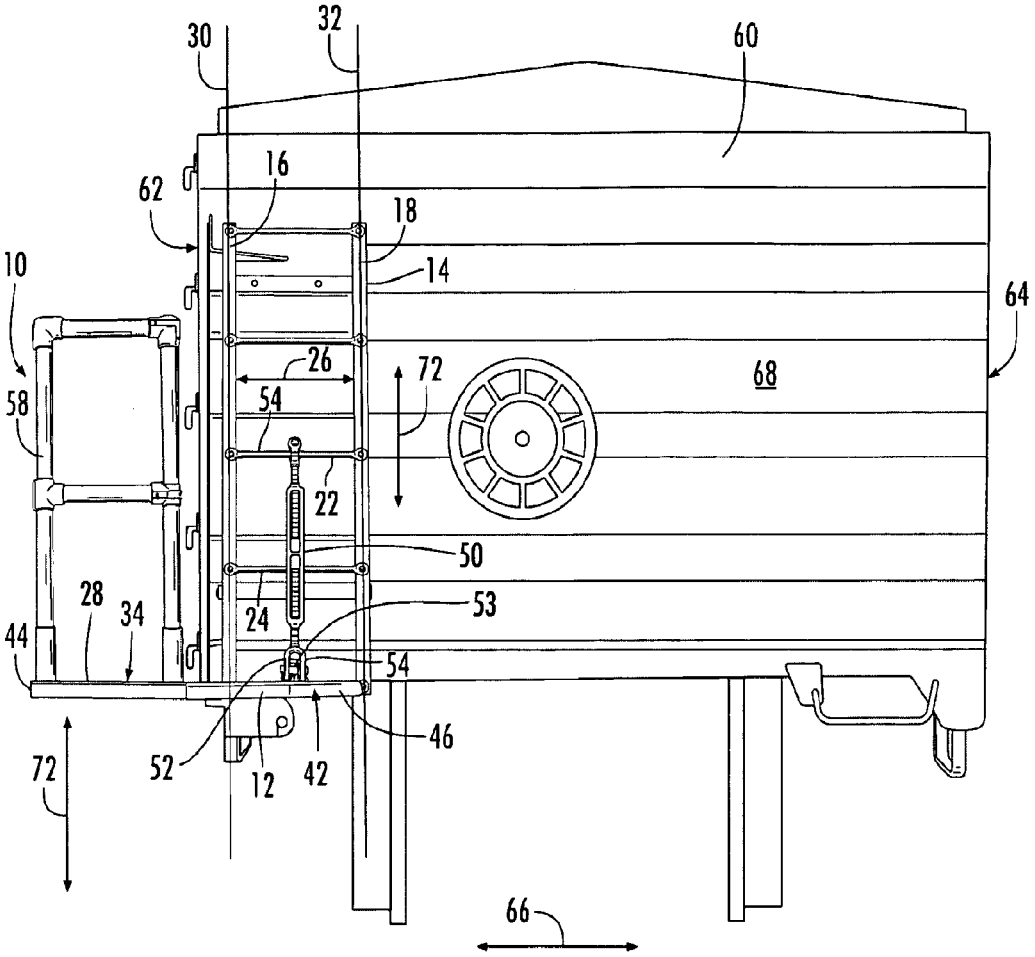
FIG. 3 is a front elevation view of the ladder attachment platform of FIG. 1.
Figure 4:
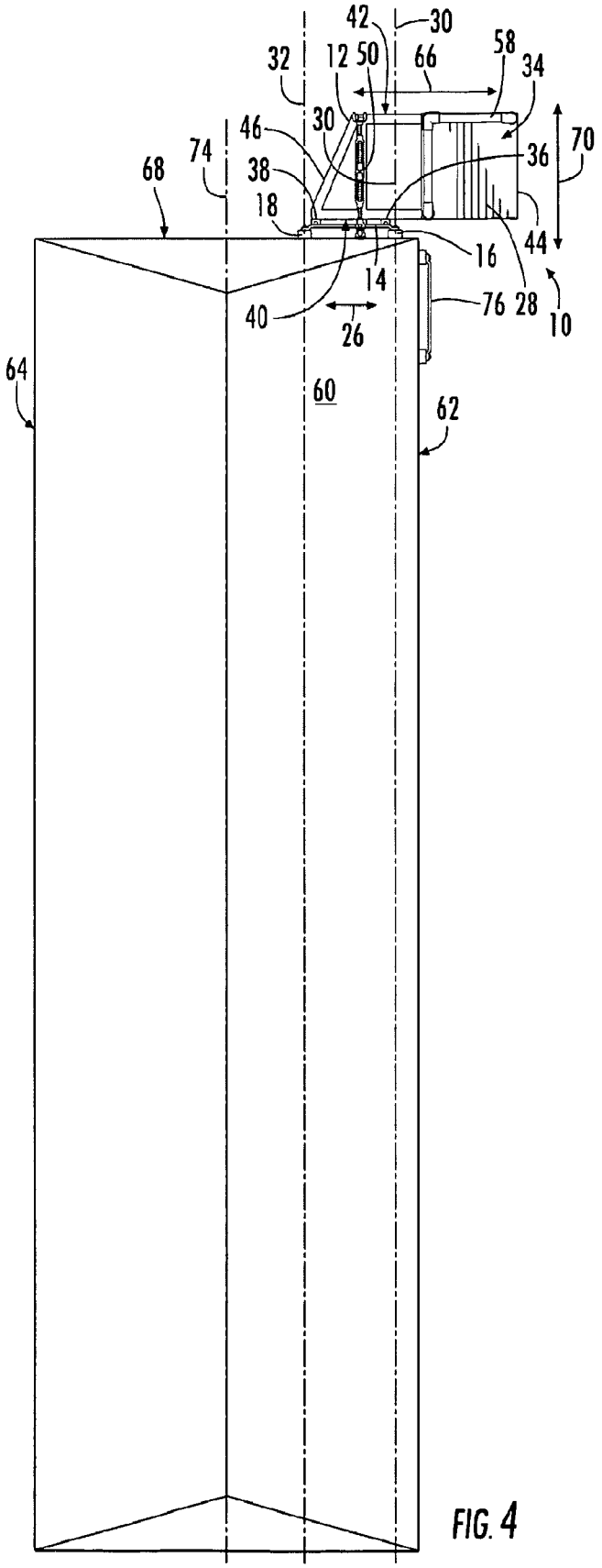
FIG. 4 is a top plan view of the ladder attachment platform of FIG. 1.
Figure 5:
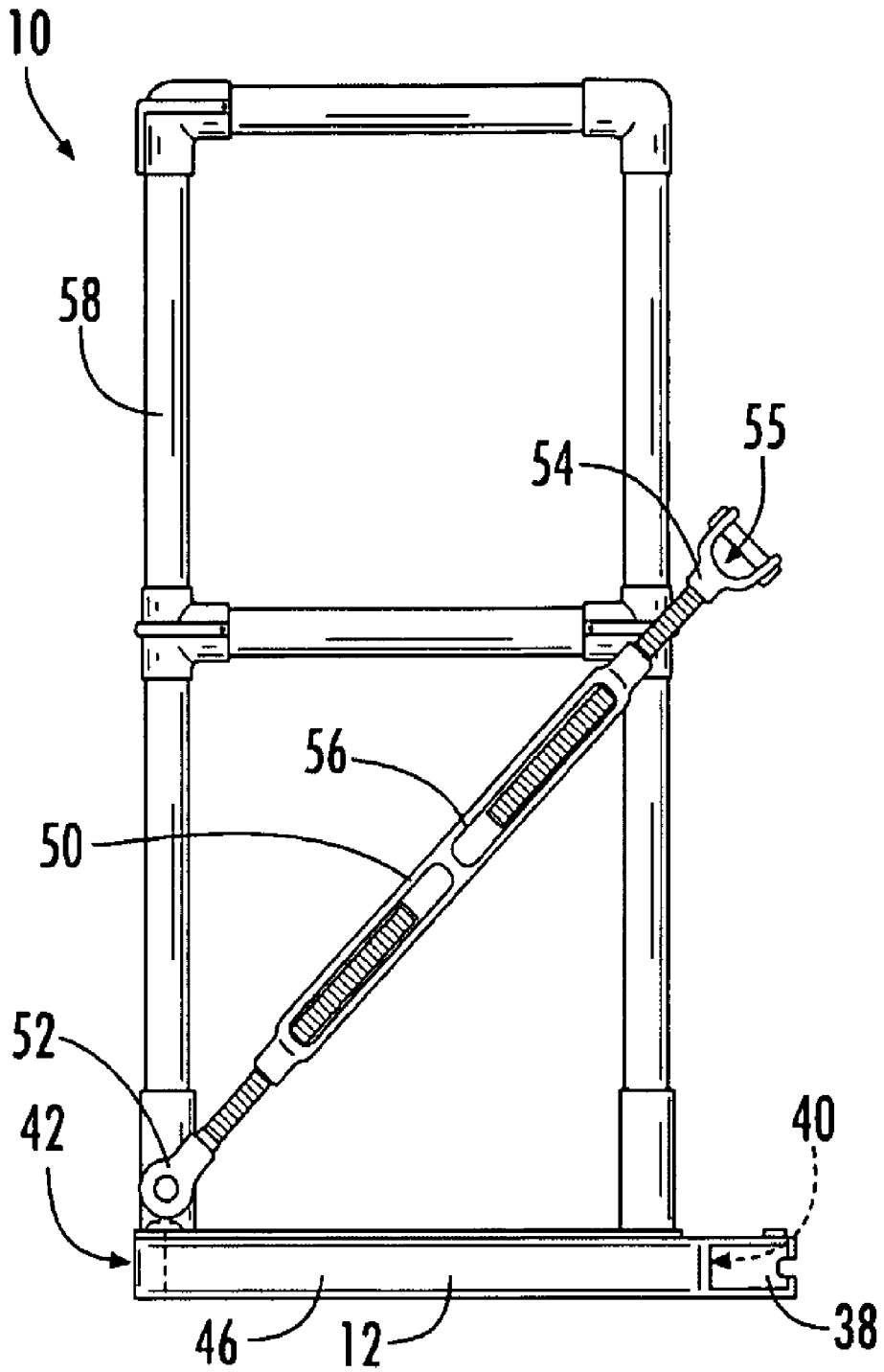
FIG. 5 is a left side elevation view of the ladder attachment platform of FIG. 1.

Referring now to FIGS. 3 and 4, the relationship of the user platform 28 to the rail car 60 will be discussed. The rail car 60 has a longitudinal centerline 74 that runs in the length direction 70. The user platform 28 may be positioned with respect to the rail car 60 so that the longitudinal centerline 74 does not run through the user platform 28. As such, the entire user platform 28 may be spaced from the longitudinal centerline 74 in the width direction 66 in certain exemplary embodiments. Likewise, the ladder 14 may be spaced from the longitudinal centerline 74 in the width direction 66 in certain arrangements so that the longitudinal centerline 74 does not extend through the ladder 14. The user platform 28 may be spaced from the ladder 14 in the width direction 66 so that no portion of the user platform 28 is located between the first plane 30 and the second plane 32. However, it is to be understood that other arrangements are possible in which a portion of the user platform 28 is located between the first plane 30 and the second plane 32. The first plane 30 extends through the first side rail 16 and the second plane 32 extends through the second side rail 18, and the first and second planes 30 and 32 are perpendicular to one another in the width direction 66. The user platform 28 may be positioned completely on one side of the first plane 30 in the width direction 66, and no portion of the user platform 28 may be located on both sides of the first plane 30 in the width direction 66. Still further, the user platform 28 may be arranged so that it is located completely on one side of the second plane 32 in the width direction 66 and so that no portion of the user platform 28 is located on both sides of the second plane 32 in the width direction 66. However, it is to be understood that the aforementioned arrangements are only exemplary and that other positioning between the user platform 28 and the planes 30 and 32 are possible.

As illustrated, the rail car 60 has a first side 62 and a second side 64 that are opposite from one another in the width direction 66. The ladder 14 and user platform 28 are located proximate to the first side 62. An end 68 of the rail car 60 extends from the first side 62 to the second side 64. The end 68 functions as the very front of the train when the locomotive is pushing the plurality of rail cars. The ladder 14 may be located on the end 68, and the entire user platform 28 may extend beyond the end 68 in the length direction 70. In other arrangements, a portion or all of the user platform 28 may be located rearward of the front end 68 in the length direction 70. Further, the entire user platform 28 may extend completely beyond the entire ladder 14 in the length direction 70. In yet other arrangements, the user platform 28 may be located in the length direction 70 on either side of the ladder 14, or may be located on one side of the ladder 14 in the length direction 70 and located at the same location as the ladder 14 in the length direction 70.

The entire user platform 28 may be located outboard of the first side 62 in the width direction 66. In other exemplary embodiments, a portion of the user platform 28 is located outboard of the first side 62 in the width direction 66, and a portion of the user platform 28 is located inboard of the first side 62 in the width direction 66. As such, a portion or all of the user platform 28 may be located outboard of the rail car 60 in the width direction 66. The location of the user platform 28 and other portions of the ladder attachment platform 10 may still be selected so that railroad clearances with respect to the width direction 66 and vertical direction 72 are satisfied such that the user platform 28 and other portions of the ladder attachment platform 10 do not contact tunnel walls, switches, or other items associated with rail traffic. The user may stand on the user platform 28 and can access a side ladder 76 that is attached to the first side 62 of the rail car 60. The handrail assembly 58 is arranged so that access to and from the side ladder 76 and user platform 28 is not impeded. The user platform 28 allows the user to simply stand thereon and perform activities with both hands. Alternatively, the user may lean a portion of his or her body against the handrail assembly 58 for support while using one or more hands to do various activities. Further, the user can grasp the handrail assembly 58 and/or side ladder 76 with one or more hands for additional support when standing on the user platform 28. The user platform 28 may be a stable surface that allows the user to remain in a normal standing position thereon with his or her hands free to operate an emergency brake, radio, or provide flag signals.

Although shown and illustrated as being used with a rail car 60 in a train, it is to be understood that the ladder attachment platform 10 need not be associated with a ladder 14 of a rail car 60. For example, the ladder attachment platform 10 can be used with ladders 14 employed in various applications. For example, the ladder attachment platform 10 can be made of lighter materials and attached to a tower ladder 14. The ladder attachment platform 10 may find utility upon being used in conjunction with ladders 14 on a chimney, radio tower, or water tank. Such use allows a user to extend the working surface of the ladder 14 so that other areas next to the ladder 14 can be accessed. The ladders 14 associated for use with the ladder attachment platform 10 are contemplated as being fixed ladders. As such, the ladders 14 are generally permanently fixed to the structure to which they are used. A portable ladder, on the other hand, can be moved from place to place by the user and is not permanently associated with any particular structure. However, it is to be understood that the ladder attachment platform 10 can be used with portable ladders 14 in certain exemplary embodiments and is not limited for use with a fixed ladder 14.

The ladder attachment platform 10 may be arranged so that the base 12 is attached to the rungs of the ladder 14 and no other portion of the rail car 60 or ladder 14. In this regard the base 12 may not be attached or contact the side rails 16 and 18 of the ladder 14. Further, the base 12 need not contact any other portion of the rail car 60 and thus the only points of contact between the base 12 or any other portion of the ladder attachment platform 10 is at the rungs of the ladder 14. The points of contact in this regard are between the first and second attachment members 36 and 38 and the first rung 20 and between the turnbuckle 50 and the second rung 22. However, in accordance with other exemplary embodiments, portions of the rail car 60 and ladder 14 in addition to or alternatively to the rungs may contact the base 12 or other portions of the ladder attachment platform 10.

It is to be understood that as used herein the terms attached, attachable, attachment and so forth are to be construed liberally unless otherwise noted. For example, the terms may define two components that are integrally formed with one another or that are separate components that are connected to one another through the use of welding, adhesives, mechanical fasteners, or other means. Further, the terms may define two components that may be capable of pivoting, sliding, or moving with respect to one another upon the use of these terms as their attachment may be pivoting attachment, sliding attachment, etc. Further, the terms may also mean that the two components contact one another. However, in some arrangements an intervening piece such as a bracket or fastener can be between the two components so that they do not actually contact one another. As such, the foregoing terms mean that the two components contact one another in some embodiments, and the foregoing terms also mean that the two components do not contact one another in other embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A ladder attachment platform, comprising:

a base for attachment to a ladder, wherein the ladder has a first side rail and a second side rail, and wherein the ladder has a plurality of rungs that extend from the first side rail to the second side rail in a lateral direction;

a user platform for having a user of the ladder attachment platform stand thereon, wherein the user platform is carried by the base, wherein the user platform is positioned with respect to the ladder such that the user platform is not located between a first plane that extends through the first side rail and is perpendicular to the lateral direction and a second plane that extends through the second side rail and is perpendicular to the lateral direction;

a first attachment member that is a clevis fastener that is attached to a first side of the base and that is attachable to a first one of the plurality of rungs of the ladder; and a second attachment member that is a clevis fastener that is attached to the first side of the base and that is attachable to the first one of the plurality of rungs of the ladder.

2. The ladder attachment platform as set forth in claim 1, wherein the base is made of a plurality of square tubular members, and wherein the user platform is a solid plate having an anti-skid upper surface.

3. The ladder attachment platform as set forth in claim 1, further comprising a turnbuckle that is attached to the base and that is attached to a second one of the rungs of the plurality of rungs of the ladder.

4. The ladder attachment platform as set forth in claim 1, further comprising a handrail assembly that extends vertically above the base and the user platform and that functions to impede a user from exiting the user platform in a direction towards the location of the base where the first plane extends through the base, and wherein the base has a second side that is located opposite from the first side, and wherein the handrail assembly functions to impede a user from exiting the user platform across the second side of the base, wherein the handrail assembly is open to allow a user on the user platform to exit the user platform across the first side of the base and across an end of the base that extends from the first side of the base to the second side of the base.

5. The ladder attachment platform as set forth in claim 1, wherein the ladder is attached to a rail car.

6. The ladder attachment platform as set forth in claim 3, further comprising a handrail assembly that extends vertically above the base and the user platform and that functions to impede a user from exiting the user platform in a direction towards the location of the base where the first plane extends through the base, and wherein the base has a second side that is located opposite from the first side, and wherein the handrail assembly functions to impede a user from exiting the user platform across the second side of the base, wherein the handrail assembly is open to allow a user on the user platform to exit the user platform across the first side of the base and across an end of the base that extends from the first side of the base to the second side of the base.

7. A ladder attachment platform, comprising:

a base for attachment to a ladder, wherein the ladder has a first side rail and a second side rail, and wherein the ladder has a plurality of rungs that extend from the first side rail to the second side rail in a lateral direction;

a user platform for having a user of the ladder attachment platform stand thereon, wherein the user platform is carried by the base;

a first attachment member that is attached to the base and that is attachable to a first one of the plurality of rungs of the ladder;

a turnbuckle that is attached to the base and that is attachable to a second one of the rungs of the plurality of rungs of the ladder; and a second attachment member that is attached to the base and that is attachable to the first one of the plurality of rungs of the ladder;

wherein the first attachment member is a clevis fastener that is attached to a first side of the base and is not movable with respect to the first side of the base, wherein the first one of the plurality of rungs of the ladder is disposed within the opening of the clevis fastener that is the first attachment member; and wherein the second attachment member is a clevis fastener that is attached to the first side of the base and is not movable with respect to the first side of the base, wherein the first one of the plurality of rungs of the ladder is disposed within the opening of the clevis fastener that is the second attachment member.

8. The ladder attachment platform as set forth in claim 7, wherein the turnbuckle is attached to the base so as to be capable of pivoting with respect to the base, and wherein the length of the turnbuckle is capable of being adjusted when the turnbuckle is attached to the second one of the rungs of the plurality of rungs of the ladder.

9. The ladder attachment platform as set forth in claim 7, wherein the ladder is attached to a rail car.

10. The ladder attachment platform as set forth in claim 7, wherein the base is made of a plurality of square tubular members, and wherein the user platform is a solid plate having an anti-skid upper surface.

11. The ladder attachment platform as set forth in claim 7, wherein the base has a first side and a second side that is opposite from the first side, and further comprising a handrail assembly that extends vertically above the base and the user platform and that functions to impede a user from exiting the user platform in a direction towards the turnbuckle, and wherein the handrail assembly functions to impede a user from exiting the user platform across the second side of the base, wherein the handrail assembly is open to allow a user on the user platform to exit the user platform across a first side of the base and across an end of the base that extends from the first side of the base to the second side of the base.

12. A ladder attachment platform, comprising:

a rail car having a first side and a second side that are located opposite from and spaced from one another in a width direction, wherein the rail car has an end that extends in the width direction from the first side to the second side;

a ladder attached to the end of the rail car;

a base attached to the ladder;

a user platform for having a user of the ladder attachment platform stand thereon, wherein the user platform is carried by the base and is closer to the first side of the rail car than the second side of the rail car, wherein at least a portion of the user platform is located outboard from the first side of the rail car in the width direction; and wherein the entire user platform is located completely outboard from the first side of the rail car in the width direction.

13. The ladder attachment platform as set forth in claim 12, wherein the user platform is a solid plate having an anti-skid upper surface.

14. The ladder attachment platform as set forth in claim 12, wherein the entire user platform is located in a length direction beyond the end of the rail car such that no portion of the user platform directly faces the first side of the rail car.

15. The ladder attachment platform as set forth in claim 12, wherein the base has a first side and a second side that is opposite from the first side, wherein the first side of the base is closer to the end of the rail car than the second side of the base; and further comprising a handrail assembly that extends vertically above the base and the user platform and that functions to impede a user from exiting the user platform in the inboard direction, and wherein the handrail assembly functions to impede the user from exiting the user platform across the second side of the base, wherein the handrail assembly is open to allow a user on the user platform to exit the user platform across the first side of the base and across an end of the base that extends from the first side of the base to the second side of the base, wherein at least a portion of the handrail assembly is located outboard from the first side of the rail car in the width direction.

16. The ladder attachment platform as set forth in claim 12, further comprising:

a first attachment member that is a clevis fastener that is attached to a first side of the base and that is attached to a first rung of the ladder;

a second attachment member that is a clevis fastener that is attached to the first side of the base and that is attached to the first rung of the ladder; and a turnbuckle that is attached to the base and that is attached to a second rung of the ladder.

17. A ladder attachment platform, comprising:

a base for attachment to a ladder, wherein the ladder has a first side rail and a second side rail, and wherein the ladder has a plurality of rungs that extend from the first side rail to the second side rail in a lateral direction;

a user platform for having a user of the ladder attachment platform stand thereon, wherein the user platform is carried by the base, wherein the user platform is positioned with respect to the ladder such that the user platform is not located between a first plane that extends through the first side rail and is perpendicular to the lateral direction and a second plane that extends through the second side rail and is perpendicular to the lateral direction; and, a turnbuckle that is attached to the base and that is attached to a second one of the rungs of the plurality of rungs of the ladder.

18. The ladder attachment platform as set forth in claim 17, further comprising a handrail assembly that extends vertically above the base and the user platform and that functions to impede a user from exiting the user platform in a direction towards the location of the base where the first plane extends through the base, and wherein the base has a second side that is located opposite from the first side, and wherein the handrail assembly functions to impede a user from exiting the user platform across the second side of the base, wherein the handrail assembly is open to allow a user on the user platform to exit the user platform across the first side of the base and across an end of the base that extends from the first side of the base to the second side of the base.

19. A ladder attachment platform, comprising:

a base for attachment to a ladder, wherein the ladder has a first side rail and a second side rail, and wherein the ladder has a plurality of rungs that extend from the first side rail to the second side rail in a lateral direction;

a user platform for having a user of the ladder attachment platform stand thereon, wherein the user platform is carried by the base;

a first attachment member that is attached to the base and that is attachable to a first one of the plurality of rungs of the ladder;

a turnbuckle that is attached to the base and that is attachable to a second one of the rungs of the plurality of rungs of the ladder; and a base made of a plurality of square tubular members, and wherein the user platform is a solid plate having an anti-skid upper surface.

20. The ladder attachment platform as set forth in claim 19, wherein the base has a first side and a second side that is opposite from the first side, and further comprising a handrail assembly that extends vertically above the base and the user platform and that functions to impede a user from exiting the user platform in a direction towards the turnbuckle, and wherein the handrail assembly functions to impede a user from exiting the user platform across the second side of the base, wherein the handrail assembly is open to allow a user on the user platform to exit the user platform across a first side of the base and across an end of the base that extends from the first side of the base to the second side of the base.

* * * * *